Nov. 30, 1948. J. A. EBELING 2,455,164
RADIO POSITION FINDING SYSTEM
Filed May 22, 1945 4 Sheets-Sheet 1

INVENTOR.
J. A. Ebeling
BY
Knowles.
ATTORNEYS.

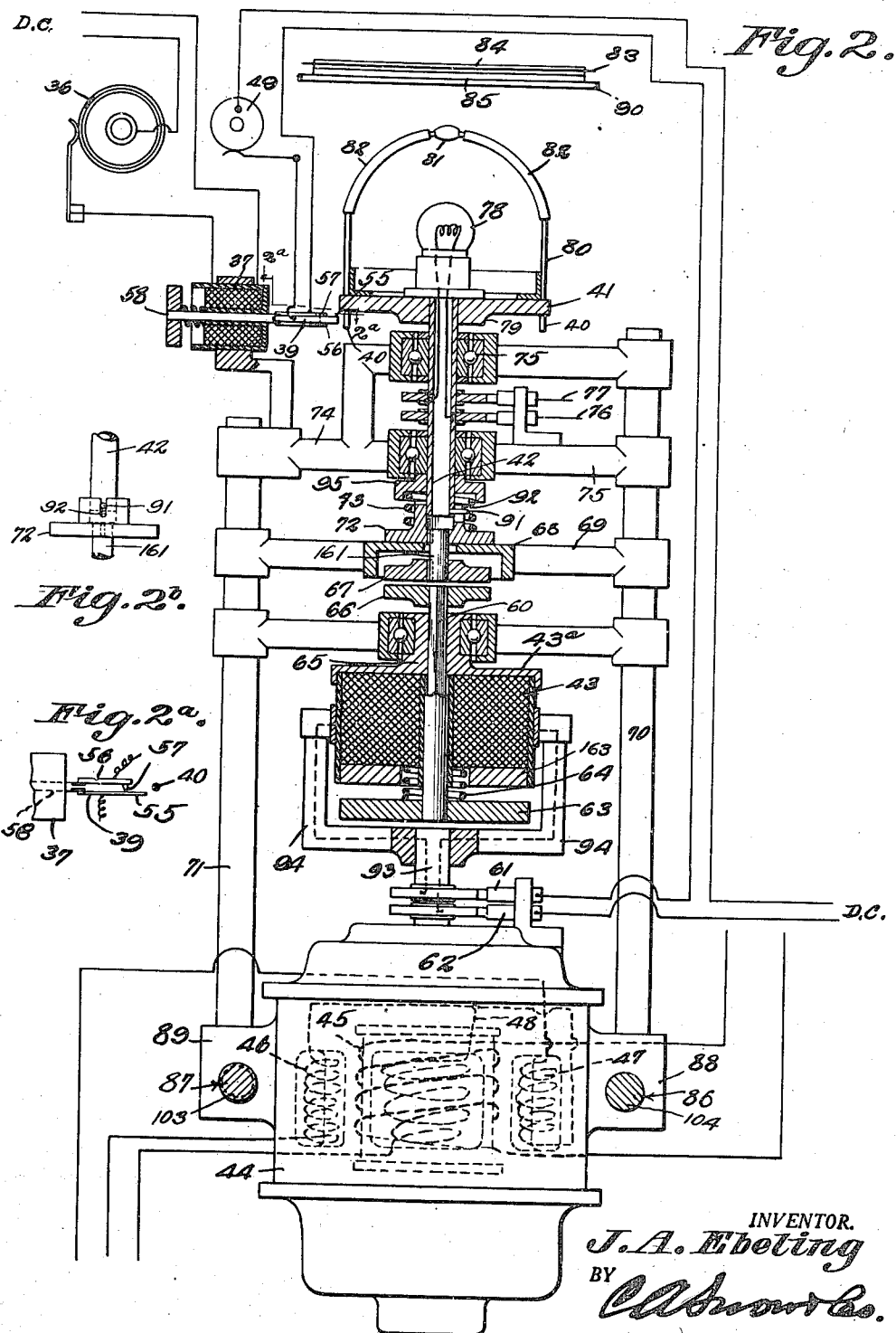

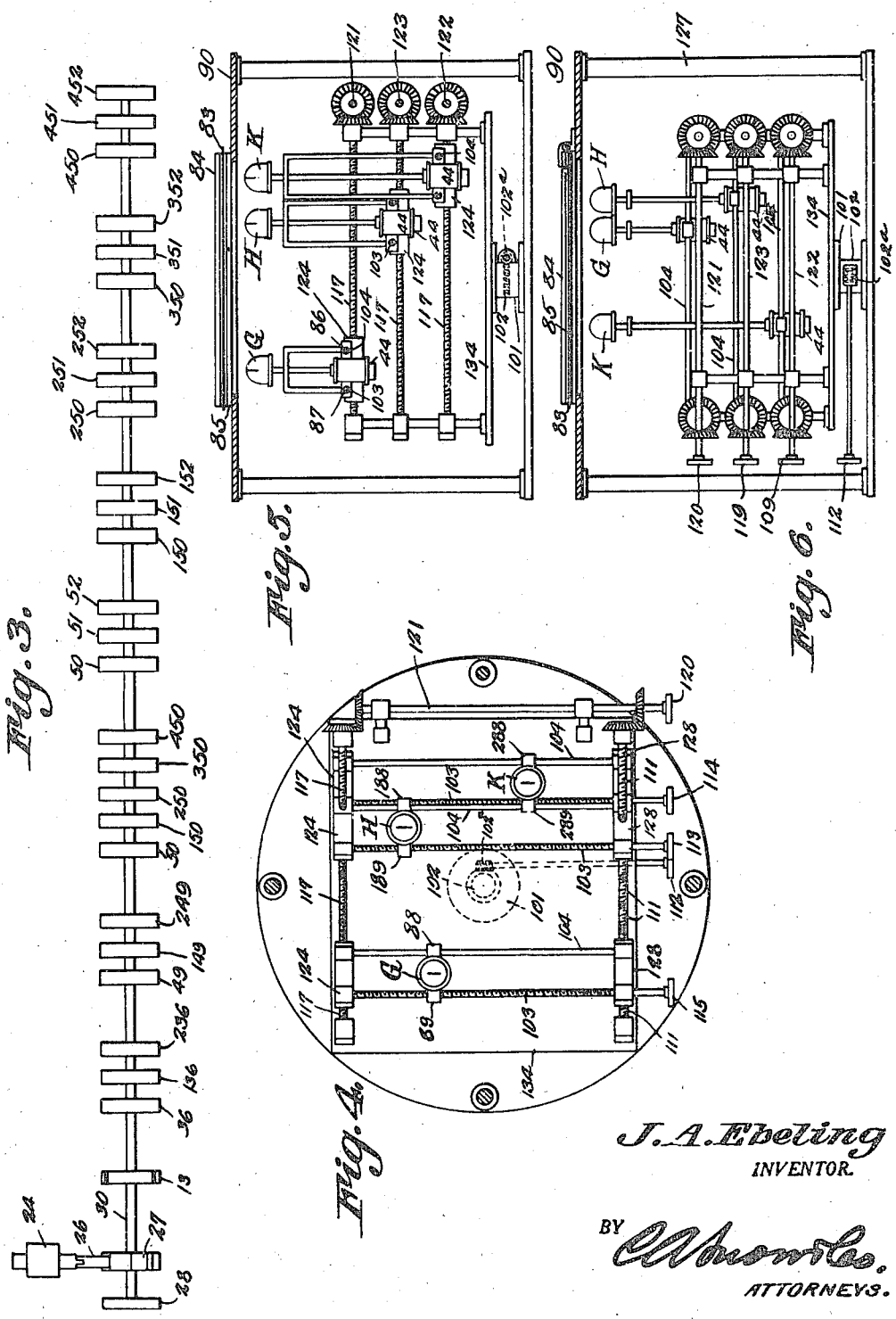

Nov. 30, 1948.      J. A. EBELING      2,455,164
RADIO POSITION FINDING SYSTEM
Filed May 22, 1945     4 Sheets-Sheet 4
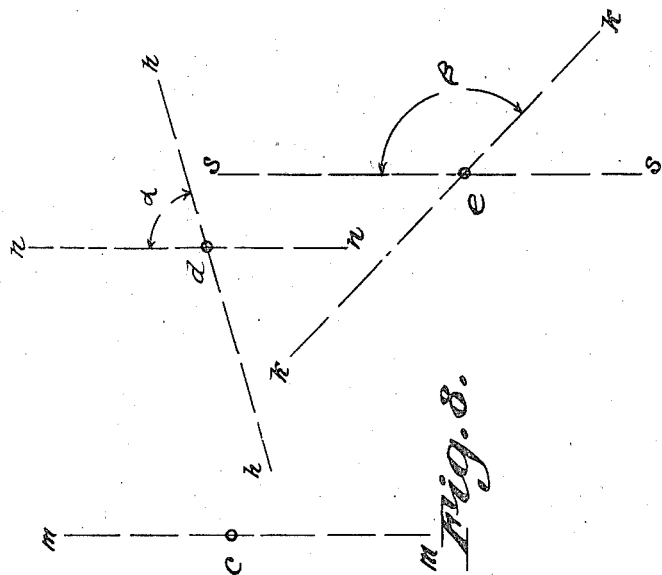
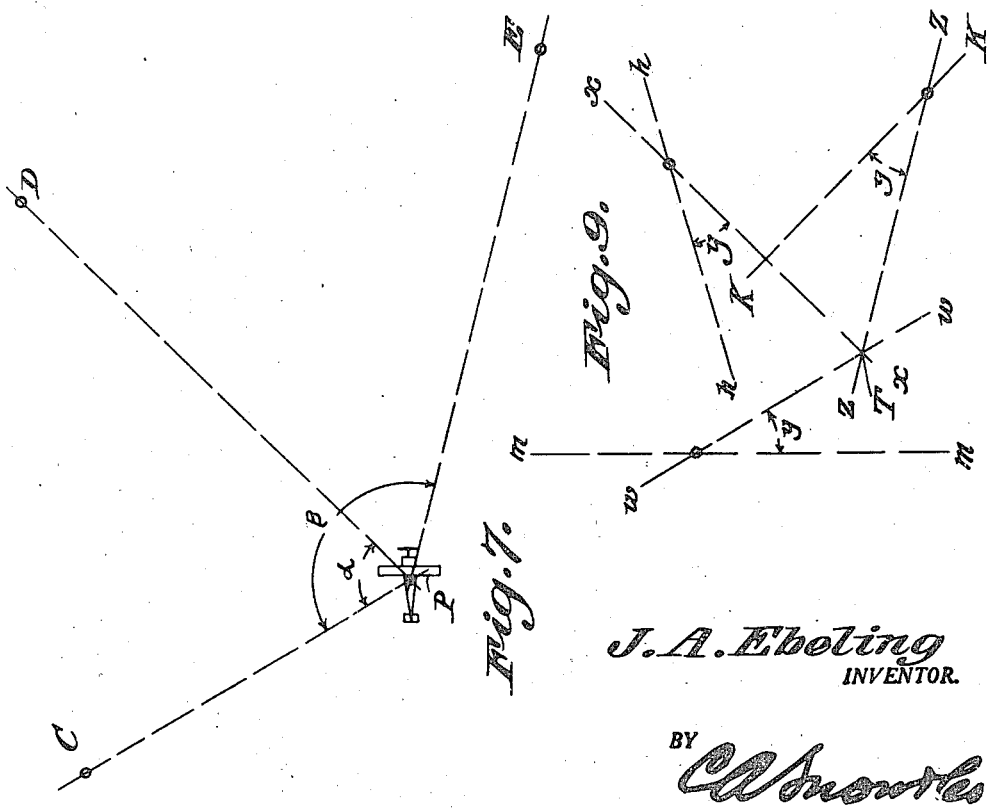
J. A. Ebeling
INVENTOR.
BY
ATTORNEYS.

Patented Nov. 30, 1948

2,455,164

UNITED STATES PATENT OFFICE 2,455,164

RADIO POSITION FINDING SYSTEM

James A. Ebeling, Charleston, W. Va.

Application May 22, 1945, Serial No. 595,241

5 Claims. (Cl. 343—112)

My invention relates to a radio position finding system for aircraft in flight or other mobile craft.

An object of my invention is to provide a system for rapidly and accurately determining the position of aircraft in flight or of other mobile craft, by radio observation of the bearings of three radio transmitting stations.

Another object of my invention is to provide a system in which the radio bearings of radio transmitting stations are accurately and rapidly displayed on a translucent map, and bearing observing elements of the system oriented to indicate the position of the aircraft at the time of observation.

A further object of my invention is to provide a system in which the bearing lines of radio transmitting stations are projected as individual illuminated lines on a translucent map plate, and the position of the aircraft determined as the intersection of the projected lines.

Still another object of my invention is to provide a system responsive to adjustment of a receiving coil antenna to a position at right angles to a radio wave to automatically successively connect and position individual light projecting means corresponding to the respective transmitting stations.

Heretofore in the radio position finding art, systems have been provided for automatic position finding, but such systems have been subject to serious delays and inaccuracies in operation which greatly impaired their usefulness.

I provide a system in which signals are successively directionally received from three different existing radio transmitting stations, such as broadcasting stations, each transmitting on a different frequency, and individual direction indicating units are positioned under the points on a translucent map displaying the location of the selected transmitting stations, and respectively oriented to indicate on the map by a projected illuminated beam the respective bearings of the transmitting stations from the aircraft.

My invention will be understood by reference to the following specification and the accompanying drawings, wherein like parts are indicated by like characters of reference, and wherein:

Figure 2 is an elevation with parts in section of the details of the direction or bearing indicator for giving an illuminated visual linear indication of the direction of a transmitting station.

Figure 2A is a detailed view taken on the line 2A—2A of Fig. 2 showing the contacting switch element of the direction indicator of Fig. 2.

Figure 2B shows a detail of the pin and slot connection of a clutch plate of the bearing indicator of Fig. 2.

Figure 3 shows the step-by-step switch control system with its ratchet and control shaft and various disk switch elements.

Figure 4 is a top plan view with cover plate removed, of the assembly for mounting and controllably adjusting the position of a group of three direction indicators, individually or together.

Figure 5 is a front elevation of the assembly of Figure 4.

Figure 6 is a side elevation of the assembly of Figure 4.

Figure 7 illustrates the principle of determining by my system the respective bearings of three transmitting stations from an aircraft in flight.

Figure 8 illustrates the operation of my system and shows the three illuminated lines as projected on a translucent map plate representing the observed bearings of three radio transmitting stations.

Figure 9 shows the three projected illuminated lines of Figure 8 after the assembly of three direction indicators has been rotated through the same angle until the three projected illuminated lines intersect in a point representing the aircraft position on the map.

Figure 1:
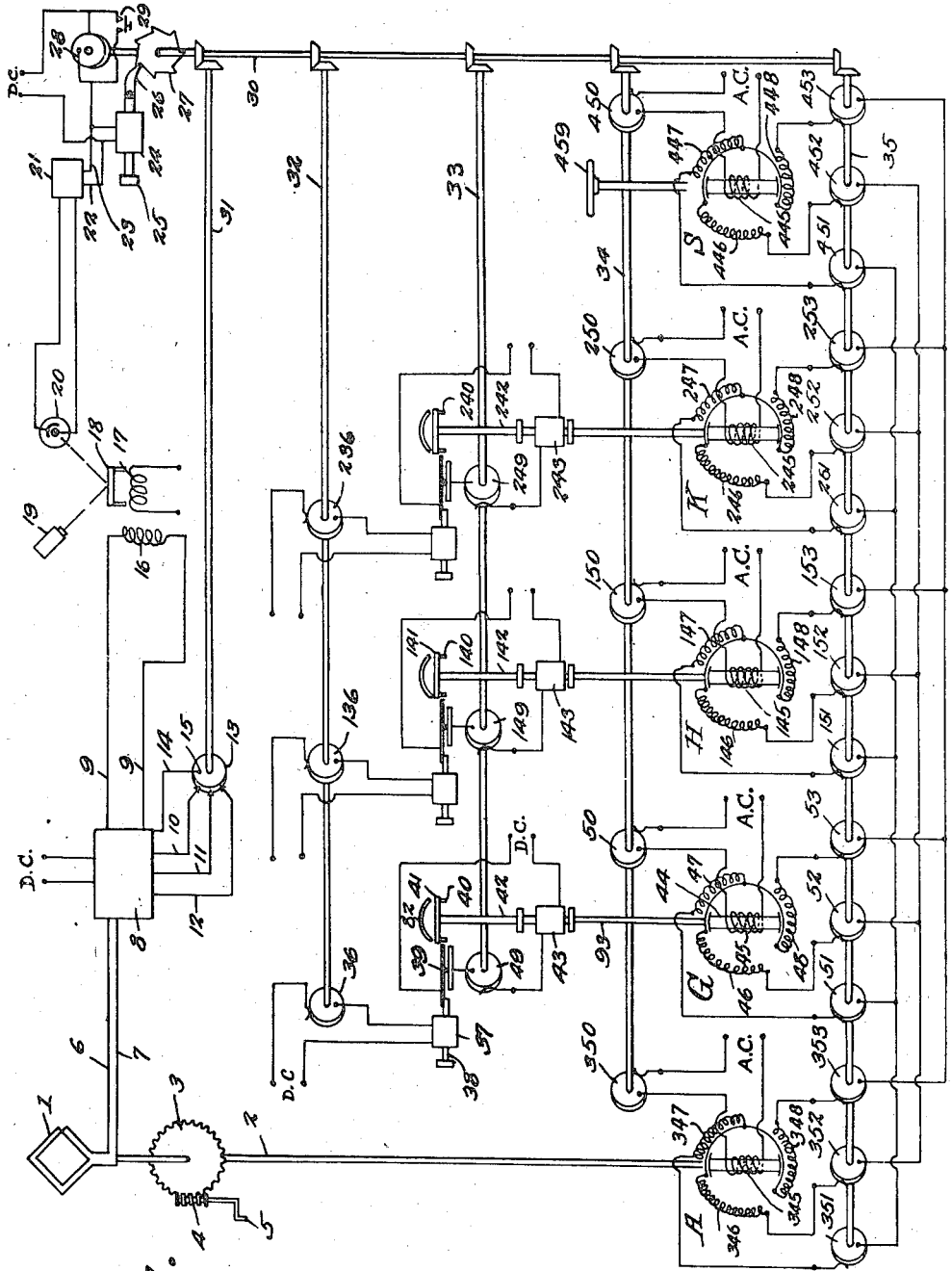
Figure 1 is a schematic diagram of my position finding system showing the adjustable coil antenna and the telemetric unit controlled thereby, and the step-by-step switch mechanism for automatically successively giving an illuminated visual indication of the bearings of different radio transmitting stations as they are successively tuned in and observed.

The position finding system of my invention is accurate and dependable in use and will minimize expenditure of time and effort, and displays accurately the momentary position of the aircraft in flight in a manner not heretofore attainable.

In the position finding system which I provide, the receiving set is successively tuned to different frequencies of the several different transmitters and the receiving coil antenna adjusted to a position at right angles to the received wave from the respective stations causing a moving coil and mirror instrument to actuate a photo-electric cell which advances a step-by-step switch mechanism to complete circuit connections to actuate indicating means in a desired manner.

Referring to the drawings in detail, in Figure 1 a rotatable coil antenna as shown at 1 is mounted on a rotatable shaft 2. The shaft 2 is rotated by a gear 3 engaging a worm 4 turned by a handle 5, or a separate motor may be provided for rotating shaft 2. The coil antenna is connected by leads 6 and 7 to a radio receiving set 8 which incorporates provision for three fixed receiving tuning circuits to selectively receive any desired one of three different frequencies. This selective tuning arrangement is conventional and is not shown in the drawings, and may comprise three adjustable condensers. The three individual tuning elements of receiving set 8 are connected by leads 10, 11, 12, to contact shoes of a rotary disk switch 13 formed of insulating material and having a peripheral contact segment to which connection is made by connecting means 15, which segment is adapted in successive positions to contact any desired one of three shoes. The contact element 15 is connected by lead 14 to the tuning system of receiving set 8.

The output circuit of receiving set 8 extends through leads 9, 9, to a suitable signal indicating instrument such as a moving coil galvanometer having fixed coil 16 connected to leads 9, 9, and having a moving coil 17 in actuating relation with coil 16, the moving coil 17 carrying mirror 18. A suitable light source 19 projects a beam on mirror 18. Photo-electric cell 20 is so positioned that when mirror 18 is in null position, the beam reflected from mirror 18 impinges upon photo-electric cell 20 and produces an output voltage therefrom. The null position of mirror 18 will correspond to minimum received voltage on coil antenna 1, that is, the adjustment of coil antenna 1 to a position at right angles to the direction of the wave received from the transmitting station to which the receiving set 8 is tuned.

The output of photo-electric cell 20 is connected to a suitable amplifier or relay 21 whose output is connected to the actuating winding of a solenoid 24 having a plunger core 25 carrying at its end a pawl 26. A ratchet 27 having seven teeth is carried on a drive shaft 30 and is adapted to be advanced step-by-step by action of pawl 26 upon successive energization of solenoid 24.

On shaft 30 there is also carried a disk switch element 28 formed of insulating material having on its periphery a contact segment which in a certain position of shaft 30 will be closed, and is connected in parallel with the output of amplifier 21 to the actuating winding of solenoid 24, causing pawl 26 to advance ratchet 27 in this determined position of shaft 30.

A push button 29 is also connected in parallel with disk switch 28 and the actuating winding of solenoid 24, which will manually cause energization of solenoid 24 and advance ratchet 27 one step when desired. The ratchet drive shaft 30 rotates a number of other similar disk switch elements which may be carried on the same drive shaft 30, as shown in Figure 3, or which may be carried in groups on secondary shafts 31, 32, 33, 34 and 35, connected to drive shaft 30 by suitable beveled gears, as shown in Figure 1. As shown in Figure 1, the three-position tuning disk switch 13 is carried on secondary shaft 31, and is driven by drive shaft 30 so that in the proper position of drive shaft 30, the tuning system of receiver 8 is tuned to the desired one of the three transmitting stations.

The bearing of a particular radio transmitting station from the aircraft in flight as determined by rotating coil antenna 1 to the null position, is displayed by a direction or bearing indicating unit G, which is shown in detail in Figure 2. Individual direction or bearing indicating units G, H, K, are shown generally in Figure 1, for use in indicating the bearings of the three different radio transmitting stations to which receiver 8 may be successively tuned, and the disk switches driven by drive shaft 30 are advanced step-by-step to make various connections to direction indicating units G, H, K, successively, to display the bearing of the corresponding transmitting station at a given time, according to which transmitting station the receiver is tuned to at that time. Each of the direction indicating units G, H, K, includes three-circuit telemetric elements including a rotor winding as 45 and three field windings as 46, 47, 48 of unit G. The direction indicating unit H has corresponding rotor winding 145, and three field windings 146, 147, 148. The direction indicating unit K has telemetric elements comprising rotor winding 245 and field windings 246, 247, 248.

A set of telemetric elements indicated at A acts as a transmitter for the telemetric receiving elements of units G, H, K. The rotor 345 of telemetric set A is mounted to be driven by shaft 2 carrying coil antenna 1. Telemetric set A has field windings 346, 347, 348.

A set S of telemetric elements is also adapted for use as a manual transmitter and comprises a rotor 445 and field windings 446, 447, 448. The rotor 445 of transmitter S is adjustable in position by manually controllable means such as a hand wheel 459.

Circuit connections are provided for applying alternating current from a common source to all of the rotors 45, 145, 245, 345 and 445, through individual rotating disk switches 50, 150, 250, 350, 450, shown.

The three field windings of each of the telemetric sets G, H, K, S, are interconnected in conventional manner so that a change in the position of the rotor of any transmitter normally, when connections are completed, causes a corresponding change in the position of the rotor of the several telemetric receivers. The disk switch 50 is connected in the supply circuit of rotor 45 of disk indicator G and is adapted in a desired manner, in certain positions, to respectively close and open the supply circuit of rotor 45. Disk switch 50 is driven by ratchet drive shaft 30, and in the arrangement shown in Figure 1 is mounted on a supplementary shaft 34. The similar disk switches 150, 250, 350, 450 are also driven by ratchet drive shaft 30, and in Figure 1 may be mounted on supplementary shaft 34, and are respectively inserted in the supply circuits of the respective rotors of units H, K, A, S.

The field windings 46, 47, 48 of direction indicating unit G have one terminal of each connected to a common point and have their other terminals respectively connected through disk switches 51, 52, 53 to the telemetric interconnected wiring system. The disk switches 51, 52, 53 are driven by ratchet drive shaft 30 and in the arrangement shown in Figure 1 are mounted on a supplementary shaft 35. Disk switches 51, 52, 53 are arranged in particular positions of ratchet drive shaft 30 to close the field connections of field windings 46, 47, 48.

Similar disk switches 151, 152, 153 are provided for the field winding connections of direction indicating unit H, and disk switches 251, 252, 253 are provided in the field winding connections of direction indicating unit K. Similar disk switches 351, 352, 353 are provided in the field connections of telemetric transmitter A, and disk switches 451, 452, 453 are provided in the field connections of manual telemetric transmitter S. In the arrangement shown in Figure 1, all of the disk switches for the field connections of the telemetric units are mounted on supplementary shaft 35.

The details of the arrangement of each of the direction indicating units G, H, K, are shown in Figure 2, for unit G. The telemetric elements are shown in a separate housing 44, which constitutes the assembly of the rotor winding 45, and the field windings 46, 47, 48. The housing 44 supports by vertical frame members 70, 71, the indicating elements of the direction indicating unit G. On the sides of the housing 44 the shoulders 88, 89, having, respectively, bores 86, 87, are adapted to receive supporting rods along which housing 44 may travel. The rotor 45 of telemetric unit 44 is carried on a shaft 93 which carries yoke arms 94, 94, carrying solenoid 43. A lower spindle 60 extends through the center of solenoid 43 and carries at its end an iron disk 63 adapted to cooperate with the pole piece 163 of solenoid 43 and is normally held spaced therefrom by spring 64. Bearing member 65 carries solenoid 43 and is supported through ball bearings from arms connected to frame elements 70, 71. Connection to the actuating winding of solenoid 43 is made through slip rings 61, 62, connected in the manner shown in Fig. 1. It will be apparent that when the telemetric unit 44 is rotated by its transmitter, the consequent rotation of its shaft 93 will rotate yoke 94 and therewith solenoid 43.

The lower spindle 60 carries a clutch disk 66 which is adapted to engage, when raised, an upper clutch disk 67 which is fixedly carried on a stub shaft 161. Stub shaft 161 fixedly carries brake shoe 72, which is normally held in contact with a friction plate 68 which latter is held at all times in fixed position on arm 69 fixedly attached to frame members 70, 71. Friction disk 72 is normally held in position locked against friction plate 68 by means of spring 73. An upper spindle 42 is mounted above stub shaft 161 colinearly therewith and is supported through ball bearings in a suitable manner by means of arms 74 and 75, attached to frame 70, 71. In the position shown in Fig. 2, there is a space between the lower end of spindle 42 and the upper end of stub shaft 161. The upper end of spring 73 presses against bed plate 95 which is fixedly carried by upper spindle 42 as a part of the bearing structure. The rotary movements of clutch disk 72 are communicated to an upper spindle 42 by means of a pin 91 inserted in upper spindle 42, which pin is received in an axial slot 92 provided for it in the hub of clutch 72, and on which the hub of disk 72 slides up and down, as shown in Fig. 2B.

At the upper end of upper spindle 42, a housing 80 of thin metal is fixedly mounted, and there is centrally mounted therein a small electric lamp 78. At its zenith point, housing 80 has a small circular lens element 81, and situated in a vertical plane through the center of the housing of the lamp 81, arcuate or linear lens elements 82, which are adapted to project a planar or linear beam of light in the plane in which the housing 80 is oriented at a given time.

A portion of a translucent map plate 83 is positioned above, but relatively close to lens elements 81, 82, and is supported between glass plates 84, 85 upon a suitable mounting 90. The small circular lens element 81 is adapted to project a small spot or pencil of light upon the translucent map plate.

Energy for illuminating lamp 78 is continuously supplied through slip rings connected to leads 76, 77.

At diametrically opposite points on the lower circumferential edge of housing 80, there are provided two vertically depending pins 40, which are adapted to engage and displace an arm 55 of a normally closed contact or switch element 39, which is shown in detail in Figure 2A. The arm 55 of switch 39 is normally held out of the path of pin 40 and is carried on the plunger 58 of an auxiliary solenoid 37 which plunger is normally held in unactuated position by a spring, but when the solenoid pole piece 38 is attracted upon energization of the solenoid 37, plunger 58 is pulled in and projects the end of switch arm 55 into the path of pin 40 so that rotation of pin 40 will cause arm 55 to break its normal spring contact with contact point 57 carried by switch arm 56, opening the circuit. The switches 39, 139, 239, of units G, H, K, are all mounted in corresponding positions on units G, H, K.

The lower spindle 60 can slide freely up and down through a sleeve in the center of solenoid 43, but is provided with a shoulder of square cross section in its portion which passes through cover portion 43A of solenoid 43 so that lower spindle 60 rotates with solenoid 43. However, when solenoid 43 is not energized, the supporting shaft 93 of the solenoid 43 and lower clutch disk 66 carried by lower spindle 60 are free to rotate without engaging the rest of the assembly.

When solenoid 43 is energized, by connection of the supply source through the various switches described, in certain positions of drive shaft 30, the pole piece 63 is attracted against the action of spring 64, lifting lower spindle 60 and therewith the lower clutch plate 66. This causes lower clutch plate 66 to engage upper clutch plate 67 carried by stub shaft 161. The raising of stub shaft 161 raises therewith the friction plate 72, which has theretofore been held locked against fixed plate 68, and permits the rotation of upper spindle 42 and of the elements carried thereby, including lamp housing 80. The rotation movement communicated to stub shaft 161 and friction plate 72 is in turn communicated to spindle 42 by pin 91 which slides in slot 92 in the hub of friction plate 72. Upper spindle 42 and plate 41 are not raised or displaced when shafts 60 and 161 are raised but receive only rotary movement. In this manner, when the solenoid 43 has been energized, the rotation of the telemetric shaft 93 causes corresponding rotation of the plate of arcuate or linear illuminated element 82 and of the beam projected therefrom upon translucent map plate 83. However, when the connections of the actuating winding of the solenoid 43 are broken by successive advancement of the position of the contacting disk switches by rachet shaft 30, or by opening of switch 39, the lower spindle 60 again drops and clutch disk 66 is released from engagement with clutch disk 67, and friction plate 72 engages friction plate 68, locking and immobilizing in its then position the upper spindle 42 and the housing 30 and linear lens element 82.

The actuating circuit of solenoid 43 is connected in series not only through disk switch 49 driven by ratchet drive shaft 30 but also through contact switch 39 which, as stated, is adapted to be opened upon orienting of housing 80 and pins 40 into engaging position, providing auxiliary solenoid 37 has been theretofore energized by rotation of disk switch 36 by ratchet drive shaft 30 into the proper circuit closing position.

In Figure 3 is shown the preferred manner of driving the various contact disk switches upon a common drive shaft 30 driven by ratchet 27, including the three-way tuning selector switch 13 and the rotary disk switch 28 adapted to close the actuating circuit of solenoid 24. These various contact disk switches shown in Figure 3 may, of course, be driven if desired by spindles or stub shafts connected by suitable gearing or otherwise to ratchet drive shaft 30, such as, for instance, the beveled gear arrangement shown, in Figure 1.

In Figures 4–6 there is shown the assembly and housing wherein are suitably mounted a group of three of the direction indicating units G, H, K, under the translucent map plate 83 of which a fragment is shown in Figure 2. Provision is made for moving each of the direction indicating units G, H, K, under the respective points on the translucent map plate 83 representing the locations of three radio transmitting stations which are to be used for direction finding purposes. Such locating of the direction indicating units may be obtained in the manner shown in Figures 4–6 by providing two systems of threaded rods at right angles to each other.

In Figure 5 it will be seen that direction indicating unit G is carried by a rod 104 which extends through the bore 86 and shoulder 88 provided on the side of the telemetric unit 44 of Figure 2. As shown particularly in Figure 4, the rod passing through one of the bores 87 is threaded, and the bore is provided with internal threads engaging the threaded rod 103 so that rotation of threaded rod 103 by knob 115 will cause the displacement of unit G longitudinally of rod 103. Rod 103 is rotatably journaled in carriage members 124 and 128 at its respective ends. Carriage members 124 and 128 are provided with threaded bores which engage threaded rods 117 and 111 which may be rotated through beveled gears by a shaft 121 rotatable by knob 120. Positioned in the same vertical plane with shaft 121 are shafts 122 and 123 respectively similarly associated with indicating units K and H. By the rotating of the knobs 109, 119 or 120, the horizontal position of a pair of carriage members as 124 and 128 may be adjusted across the width of the arrangement shown in Figure 4, and by adjusting rotating knob 115, the position of indicator G on the rod 103 in the dimension shown vertically in Figure 4 may be adjusted. By suitable adjustment of knobs 113, 114, 115, and 109, 119, 120, each of the direction indicating units G, H, K, may be positioned under any desired point of the translucent map plate 83, to represent any desired radio transmitting station shown on that map. Direction indicating units H, and K are respectively carried on their own individual longitudinally and transversely positioned rods in a manner similar to that which has been described for unit G.

The system of rods described and the driving beveled gears and control knobs are supported from a suitable frame work mounted on a turntable 134. This turntable is carried on a base plate 101 which is carried on a rotatably mounted member 102 which is normally held clamped in fixed position and which is provided with a worm 102A which may be rotated by knob 112 to rotate the turntable to desired position. In this manner the entire assembly of the three direction indicating units G, H, and K may be rotated by knob 112.

The connections of the various elements which have been described are shown in Figure 1. The actuating winding of solenoid 43 is connected through disk switch 49 in series with the contact switch 39 which may be opened when the pin 40 carried on base plate 41 is engaged, after switch elements 39 have been projected by actuation of auxiliary solenoid 37. The auxiliary solenoid 37 is energized in the particular position of the rotary disk switch 36 which is rotated by ratchet drive shaft 30, as is also rotary disk switch 49. Corresponding to disk switch 36 of unit G are corresponding disk switches 136 and 236 of units H and K, that are shown in Figure 1 as carried on the supplementary shaft 32 driven by ratchet drive shaft 30. Corresponding to disk switch 49 of unit G are disk switches 149 and 249 of units H and K that are shown in Figure 1 as carried on the supplementary drive shaft 33 driven by ratchet drive shaft 30. Upper spindle 42 (Figure 2) after actuation of solenoid 43, will, upon rotation through an angle of not more than 180 degrees, cause one of the pins 40 to engage switch element 39 providing that auxiliary solenoid 37 has been actuated.

Figure 7 illustrates representations of lines of actual bearings as they exist from an aircraft in flight P upon three radio transmitting stations C, D, E. The angle between PC and PD is shown as α. The angle between PC and PE is shown as β. In my system, bearing lines PC, PD, PE are represented on the translucent map plate 83 as illuminated lines shown in Figure 8 as m—m passing through point c on the map representing radio transmitting station C, and line h—h passing through point d on the map representing radio transmitting station D, the line k—k passing through point e on the map representing location of radio station E. The individual projected illuminated bearing lines, as m—m, do not necessarily or ordinarily pass through the point on the translucent map representing the momentary location of the aircraft which it is desired to determine. It will be noted that the angle α between bearing line h—h for station D, and the bearing direction line m—m on n—n of transmitting station C, is equal to α in Figure 8, as in the actual existing bearing shown in Figure 7. Similarly, the angle between bearing line k—k of station E (Figure 8) and the bearing direction of line m—m on s—s (Figure 8) of transmitting station C, is equal to β as in Figure 7. It will also be noted that the bearing lines m—m, h—h, k—k, as originally displayed on the translucent map in the manner shown in Figure 8 do not ordinarily intersect in a point.

After the three bearing lines of transmitters C, D, E, have been thus determined, the connections of the telemetric units, including telemetric unit A, are so manipulated that the units G, H, K, are disconnected from control by the shaft 2 of the coil antenna 1. The assembly of the three direction indicating units is then rotated by manual operation of telemetric transmitters which rotates the three projected bearing lines on the translucent map plate through the same angle y (Figure 9) and such rotation is continued until the three bearing lines m—m, h—h, k—k (Figure 8) have intersected in a point T and have assumed the positions shown respectively as w—w, x—x, z—z (Figure 9). The point T thus determined as the point of intersection of these three lines, represents on the map the only possible point at which the aircraft could be located at the time observations of the bearing angles α and β are made. These observations and adjustments can be made rapidly and accurately. The seven successive positions of ratchet 27 provide for seven different combinations of connections through the various rotating disk switches driven by ratchet drive shaft 30, which have been described, in order to perform the various operating steps which have been mentioned.

The following table shows the circuit status of each of the various rotary disk switches driven by ratchet drive shaft 30 and connecting or disconnecting various circuit elements:

ments of coil antenna 1 are transmitted through shaft 2 to actuate telemetric transmitter unit A, which causes the rotors of telemetric units G, H, and K to assume corresponding positions. When the signal of coil antenna 1 as evidenced by the output of receiving set 8 has attained its null value, the moving coil mirror 18 has assumed a null position and reflects a beam on photo-electric cell 20 causing a current which is delivered to solenoid 24 and causes pawl 26 to advance ratchet 27 another notch into position 3 of the table. This rotates the disk switches and causes de-energization of solenoid 43 and immobilizes projector 82 of G by action of clutch plate 72 and Table

| Position | Rotors | | | | | Stators | | | | | Contractor (39, 139, 239) | | | Clutches (43, 143, 243) | | | Tuning (28) (13) | | | | Actuation |
|---|---|---|---|---|---|---|---|---|---|---|---|---|---|---|---|---|---|---|---|---|---|
| | A | G | H | K | S | A | G | H | K | S | G | H | K | G | H | K | G | H | K | Rat. | |
| 1 | d | d | d | d | d | d | d | d | d | d | d | d | d | d | d | d | d | d | d | d | |
| 2 | c | c | c | c | c | c | c | c | c | d | d | d | d | c | c | c | c | d | d | d | x |
| 3 | c | c | c | c | c | c | c | c | c | d | d | d | d | d | c | c | d | c | d | d | F |
| 4 | c | c | c | c | c | c | c | c | c | d | d | d | d | d | d | c | d | d | c | d | F |
| 5 | c | c | c | c | c | d | c | c | c | d | d | d | d | d | d | d | d | d | d | c | F |
| 6 | c | c | c | c | c | d | c | c | c | c | d | d | d | c | c | c | d | d | d | d | 28 |
| 7 | c | c | c | c | c | d | c | c | c | c | c | c | c | c | c | c | d | d | d | d | x |
| 1 | (as above) | | | | | | | | | | | | | | | | | | | | x | c—connected.
d—disconnected.
x—push button-manual operation.
F—P. E. C. on taking bearing.
28—rotary switch.

The radio transmitting stations C, D, E, by which bearing measurements are made may be chosen as any readily receivable stations located in the general neighborhood in which the aircraft is in flight which lay down a good signal level in that neighborhood. The translucent map employed must, of course, show enough of the terrain in the neighborhood in which the aircraft is flying to show the location of the three transmitting stations which are being observed. It is necessary that the three transmitting stations chosen shall operate on different operating frequencies.

Before beginning observations, each of the three direction indicating units G, H, K, is moved directly under the point on map 83 which represents the location of the corresponding transmitting station as indicated by the beam projected by lens 81. The illuminated lines projected on the map by indicating units G, H, K, are, on starting, all parallel as shown at m—m, n—n, s—s, in Figure 8. The disk switches driven by shaft 30 are all in the open or disconnected position corresponding to position 1 of the table.

In operation, starting from the setting just described, to determine a position the observer on the aircraft first presses push button 29 which energizes solenoid 24 and operates pawl 26 and advances ratchet 27 one notch, which advances all disk switches one notch into position 2 of the table. Three-way disk switch 13 is then advanced so that receiving set 8 is then tuned to the frequency of transmitting station C, and the windings of telemetric units G, H, K, A, are energized, as are solenoids 43, 143, 243. The operator then rotates coil antenna 1 by means of handle 5 and worm 4 until minimum signal is received from station C. The rotating moveplate 68, and causes direction indicating unit G to fixedly display in its portion of the translucent map plate 83 an illuminated line which shows the observed bearing direction of transmitter C as determined by the setting of coil antenna 1 and communicated by the telemetric system to direction indicating unit G. In this position 3, the disk switch 13 is rotated to tune receiving set 8 to the frequency of transmitting station D, and solenoid 43 of indicator G is de-energized, but solenoids 143 and 243 of indicators H and K are still energized.

The operator then rotates coil antenna 1 to null position for station D, whereupon the photo-electric cell again causes pawl 26 to advance ratchet 27 another step into position 4 of the table. This de-energizes solenoid 143 of unit H, immobilizing linear lens 182 of unit H and fixing on map plate 83 the line h—h representing the bearing of transmitter D. In this position 4, also, the disk switch 13 is rotated to tune receiving set 8 to the frequency of transmitting station E, and keeping solenoid 243 of indicator K still energized.

The operator then rotates coil antenna 1 to null position for transmitter E whereupon similar effects are caused, and ratchet 27 is advanced another notch into position 5 of the table, in which solenoid 243 of indicator K is deenergized, immobilizing linear lens 282 of unit K and fixing on map plate 83 the line k—k representing the bearing of transmitter E, and disconnecting field windings of telemetric transmitter A.

Advancement of disk switch 28 into position 5 also closes a circuit to energize solenoid 24 and cause a further advancement of ratchet 27 another step into position 6 of the table. In position 6, the field windings of coil actuated telemetric transmitter A remain disconnected, and the field windings of manual telemetric transmitter S are connected. At this time, the three projected illuminated lines m—m, h—h, k—k, appear on map plate 83 as shown in Figure 8, and ordinarily do not intersect in a point. The operator then manually turns hand wheel 459, which causes rotation of the rotors and projecting elements of indicators G, H, K, and rotates projected illuminated lines m—m, h—h, k—k all simultaneously through the same angle y to positions w—w, x—x, z—z, until they intersect in a point T (Figure 9), which point T on the map represents the actual location of the aircraft at the time the bearing measurements are taken, which is the fix or location sought. After this measurement has been completed, it is next necessary to adjust the various operating elements to be ready for the next observation in a subsequent location of the aircraft.

In order to thus re-set the apparatus ready for the next observation, the operator now again pushes push button 29, which actuates solenoid 24 and causes pawl 26 to advance ratchet 27 and the disk switches into position 7, in the table. In this position 7, the auxiliary contactor switch solenoids 37, 137, 237, of units G, H, K, are actuated and project switch arm elements 55, 155, 255, into the paths of pins 40, 140, 240 respectively. Also, in this position, solenoids 43, 143, 243 are energized. In this position 7, the stator windings of telemetric unit A are still disconnected from telemetric units G, H, K, but are connected to telemetric transmitter S. The operator then turns hand wheel 459 of telemetric transmitter S, which turns the rotating elements of units G, H, K, including the linear beam projectors and causes pins 40, 140, 240, to rotate until they successively engage switch arm elements 55, 155, 255, which respectively cause, at the moment of such engagement, the de-energization of clutch solenoids 43, 143, 243, and disconnects housings 80, 180, 280 from rotors 45, 145, 245, and consequent immobilization of the upper rotating elements as housing 80 at those respective points. By locking of plates 68 and 72, since switch arm elements 55, 155, 255, are all in the same position on units G, H, K, the projecting elements 82 are thus all immobilized parallel to each other.

The operator then again operates push button 29, causing pawl 26 to advance ratchet 27 another step into the next position which is position 1 of the table, ready to start on another cycle of observations.

Instead of employing the automatic receiving arrangement of a moving coil mirror and photoelectric cell, as shown in Figure 1, it is possible to provide the operator with ear phones and have him simply manipulate the push button 29 when null position is attained.

For all positions of the loop antenna other than the null position for the transmitting station to which the receiving set is tuned, the receiving set will deliver an output which will cause the moving coil mirror 17—18 to assume a position other than the null position, and the beam of light reflected from mirror 18 will not strike the photo-electric cell 20 and there will be no energization of solenoid 24 by the photo-electric cell output.

It will be evident that I have provided a radio position finding system which is simple and rugged and dependable in operation, and which will accurately and rapidly permit an operator to determine the position of a craft in motion by observations on existing radio transmitting stations, thus providing an economical manner of determining position.

It will be apparent to those skilled in the art that my system is susceptible of various modifications and substitutions without in any way departing from the principle of the operation of my invention, and all such modifications which are comprehended within the scope of the appended claims, are to be considered to be a part of my invention.

What is claimed is:

1. In a radio position finding system for mobile craft, an orientable directional antenna, a receiving set having its input connected to said antenna, tuning means for tuning said receiving set selectively to any one of three different carrier frequencies of three different transmitting stations, electrical indicating means connected to the output of said receiving set and responsive to the delivery of minimum output therefrom, a master control switch shaft adapted in successive positions to control the setting of said tuning means to said three frequencies successively, ratchet means for step-by-step rotation of said shaft, solenoid means for advancing said ratchet step-by-step, and being connected for actuation by minimum signal response of said indicating means, a translucent map plate representing the terrain being traversed by said craft, three individual rotatable visual projecting units each comprising a projecting element adapted to project an individual illuminated line on said plate, and each further comprising a rotatable telemetric element and electrically actuatable clutch means for controllably connecting said telemetric element to said projecting element, a telemetric system adapted to coordinately control the orientation of said telemetric elements of said projecting units, and being adapted to be controlled by the orientation of said directional antenna, and individual switch means controllable by said shaft in particular positions thereof adapted to connect or disconnect each of said telemetric elements to said telemetric system, other individual switch means actuatable by said shaft in particular positions thereof adapted to actuate each of said clutch means, said switch means and the connections thereof to said clutch means being so arranged that in a first position of said shaft, the illuminated line projected from the first of said rotatable projecting units represents the observed bearing of a first one of said transmitting stations, and in a second position of said shaft the illuminated line projected from the second of said rotatable projecting units represents the observed bearing of a second one of said transmitting stations without disturbing the previously projected line representing the bearing of said first station, and in a third position of said shaft the illuminated line projected from the third of said rotatable projecting units represents the observed bearing of the third one of said transmitting stations without disturbing the two previously projected lines representing the bearings of said two first stations.

2. In a radio position finding system for mobile craft, an orientable directional antenna, a receiving set having its input connected to said antenna, tuning means for tuning said receiving set selectively to any one of three different carrier frequencies of three different transmitting stations, electrical indicating means connected to the output of said receiving set and responsive to the delivery of minimum output therefrom, a master control switch shaft adapted in successive positions to control the setting of said tuning means to said three frequencies successively, ratchet means for step-by-step rotation of said shaft, solenoid means for advancing said ratchet step-by-step, and being connected for actuation by minimum signal response of said indicating means, a translucent map plate representing the terrain being traversed by said craft, three individual rotatable visual projecting units each comprising a projecting element adapted to project an individual illuminated line on said plate, and each further comprising a rotatable telemetric element and electrically actuatable clutch means for controllably connecting said telemetric element to said projection element, a telemetric system adapted to coordinately control the orientation of said telemetric elements of said projecting units, and being adapted to be controlled by the orientation of said directional antenna and individual switch means controllable by said shaft in particular positions thereof adapted to connect or disconnect each of said telemetric elements to said telemetric system, individual switch means actuatable by said shaft in particular positions thereof adapted to actuate each of said clutch means, said switch means being adapted in a first position of said shaft to energize all three said clutch means, in a second position of said shaft to energize only two of said clutch means and to de-energize the other said clutch means, and in a third position of said shaft to energize only one of said clutch means and to de-energize the other two said clutch means, whereby orientation of said antenna into null positions for each of said three stations causes successive advancement of said ratchet and shaft into successive ones of said positions and causes said projecting units to rotate into rest positions to display on said map plate illuminated lines respectively representing the bearings of said three transmitting stations.

3. A radio position finding system as set forth in claim 2, said switch means and said telemetric system further being adapted in a fourth position of said shaft to provide for manually controlled simultaneous equi-angular rotation of all three of said rotatable projecting units free of control of the orientation of said directional antenna, whereby said three projecting illuminated bearing lines may be equi-angularly transformed into an array which intersect in a point.

4. A radio position finding system as set forth in claim 2, each of said projecting units further comprising automatic re-set means including a switch connected in the actuating circuit of its said clutch means and adapted to be opened upon rotation of said shaft into a fifth position by rotation of its projecting element into initial position, to immobilize said projecting element in said initial position.

5. A radio position finding system as set forth in claim 2, said electrical indicating means comprising a moving coil mirror galvanometer and a photo-electric cell positioned to be excited by a beam reflected from the galvanometer mirror when the output signal of said receiving set attains its null value.

JAMES A. EBELING.

REFERENCES CITED

The following references are of record in the file of this patent:

UNITED STATES PATENTS

| Number | Name | Date |
|---|---|---|
| 1,977,772 | Miller | Oct. 23, 1934 |
| 2,312,336 | Holliday | Mar. 2, 1943 |
| 2,361,956 | Moseley | Nov. 7, 1944 |
| 2,378,294 | Field | June 12, 1945 |
| 2,366,772 | Ebeling | Jan. 9, 1945 |